US008199155B2

(12) United States Patent
Leroy et al.

(10) Patent No.: US 8,199,155 B2
(45) Date of Patent: Jun. 12, 2012

(54) SYSTEM, METHOD, AND COMPUTER PROGRAM PRODUCT FOR SAVING POWER IN A MULTI-GRAPHICS PROCESSOR ENVIRONMENT

(75) Inventors: Lieven P. Leroy, South San Francisco, CA (US); Saurabh Gupta, San Jose, CA (US); Terrence John Carraher, Fremont, CA (US); Todd Michael Poynter, San Jose, CA (US); KaWing Ho, Santa Clara, CA (US); Elaine K. Tam, Sunnyvale, CA (US)

(73) Assignee: NVIDIA Corporation, Santa Clara, CA (US)

( * ) Notice: Subject to any disclaimer, the term of this patent is extended or adjusted under 35 U.S.C. 154(b) by 693 days.

(21) Appl. No.: 11/604,105

(22) Filed: Nov. 22, 2006
(Under 37 CFR 1.47)

(65) Prior Publication Data

US 2008/0117222 A1    May 22, 2008

(51) Int. Cl.
G06F 15/16     (2006.01)
G06F 15/00     (2006.01)
G06T 1/00      (2006.01)

(52) U.S. Cl. ........................................ 345/502; 345/501

(58) Field of Classification Search .................. 345/502, 345/503, 504, 505, 519
See application file for complete search history.

(56) References Cited

U.S. PATENT DOCUMENTS

| | | | |
|---|---|---|---|
| 5,673,380 A | 9/1997 | Suzuki | |
| 6,473,086 B1 * | 10/2002 | Morein et al. | 345/505 |
| 6,983,384 B2 | 1/2006 | Iwaki | |
| 7,035,954 B1 * | 4/2006 | Duran | 710/302 |
| 7,649,537 B2 * | 1/2010 | Campbell et al. | 345/502 |
| 2002/0032877 A1 | 3/2002 | Iwaki | |
| 2002/0059514 A1 * | 5/2002 | Hendry et al. | 713/100 |
| 2004/0075664 A1 * | 4/2004 | Law et al. | 345/530 |
| 2004/0230871 A1 * | 11/2004 | Sekiguchi et al. | 714/36 |
| 2005/0159911 A1 | 7/2005 | Funk et al. | |
| 2005/0253778 A1 | 11/2005 | Ku et al. | |
| 2006/0119603 A1 * | 6/2006 | Chen et al. | 345/502 |
| 2006/0125833 A1 | 6/2006 | Hung | |
| 2006/0267993 A1 * | 11/2006 | Hunkins et al. | 345/502 |
| 2007/0013702 A1 * | 1/2007 | Hiroi et al. | 345/502 |
| 2007/0050769 A1 * | 3/2007 | Switzer et al. | 718/100 |
| 2007/0234086 A1 * | 10/2007 | Bernstein et al. | 713/310 |
| 2007/0283175 A1 * | 12/2007 | Marinkovic et al. | 713/320 |
| 2008/0030509 A1 * | 2/2008 | Conroy et al. | 345/502 |
| 2008/0034238 A1 * | 2/2008 | Hendry et al. | 713/323 |
| 2008/0046624 A1 * | 2/2008 | Rubin et al. | 710/302 |

OTHER PUBLICATIONS

Taiwanese Office Action from Application No. 096141505 dated Sep. 28, 2011.

* cited by examiner

Primary Examiner — Jacinta M Crawford
(74) Attorney, Agent, or Firm — Zilka-Kotab, PC

(57) ABSTRACT

A system, method, and computer program product are provided for enabling or disabling a graphics processor during runtime. In use, a command is received to disable or enable a graphics processor. Such graphics processor is enabled or disabled during runtime, in response to the command.

22 Claims, 6 Drawing Sheets

SYSTEM, METHOD, AND COMPUTER PROGRAM PRODUCT FOR SAVING POWER IN A MULTI-GRAPHICS PROCESSOR ENVIRONMENT

FIELD OF THE INVENTION

The present invention relates to power saving techniques, and more particularly to saving power during use of one or more processors.

BACKGROUND

Power saving techniques have traditionally been employed in the context of portable computers (e.g. lap-top computers, hand-held computers, mobile phones, personal digital assistants, etc.). In such environments, batteries are employed which have a finite capacity. To this end, a tradeoff is typically made between preserving such battery life and enhancing computer performance. Specifically, as additional processing is devoted to accommodate performance-enhancing capabilities, battery life suffers.

In some graphics environments, more than one graphics processor is employed. They may have similar or different processing capabilities; or may work in collaboration (e.g. NVIDIA® SLI™ technology, etc.) and/or to extend functionality more independently (e.g. such as each driving different output devices, etc.). For example, a first graphics processor may be capable of providing a limited amount of graphics processing capabilities as well as using system memory, as opposed to its own dedicated memory. Still yet, a second graphics processing may be provided with more advanced graphics processing capabilities as well as its own dedicated memory.

Of course, additional processing capabilities generally come at increased cost in terms of power. There may also be secondary sources for an increase; for example, greater memory usage, data bus activity (e.g. PCI Express), or transistor leakage (which increases with increased overall silicon area).

In the past, systems such as the one described hereinabove have selected a fixed configuration at start up, based on whether the system selected the associated additional processing capabilities over power savings, etc. This decision, however, is available only at major events such as start-up, since it is difficult, if not impossible, to selectively enable/disable a graphics processor during runtime. Neither applications nor operating systems are familiar with the notion of a runtime change in graphics processor availability.

There is thus a need for overcoming these and/or other problems associated with the prior art.

SUMMARY

A system, method, and computer program product are provided for enabling or disabling a graphics processor during runtime. In use, a command is received to disable or enable a graphics processor. Such graphics processor is then enabled or disabled during runtime, in response to the command. Thus, in some optional embodiments, runtime switching may effectively occur among a plurality of graphics processors.

DETAILED DESCRIPTION

Figure 1:
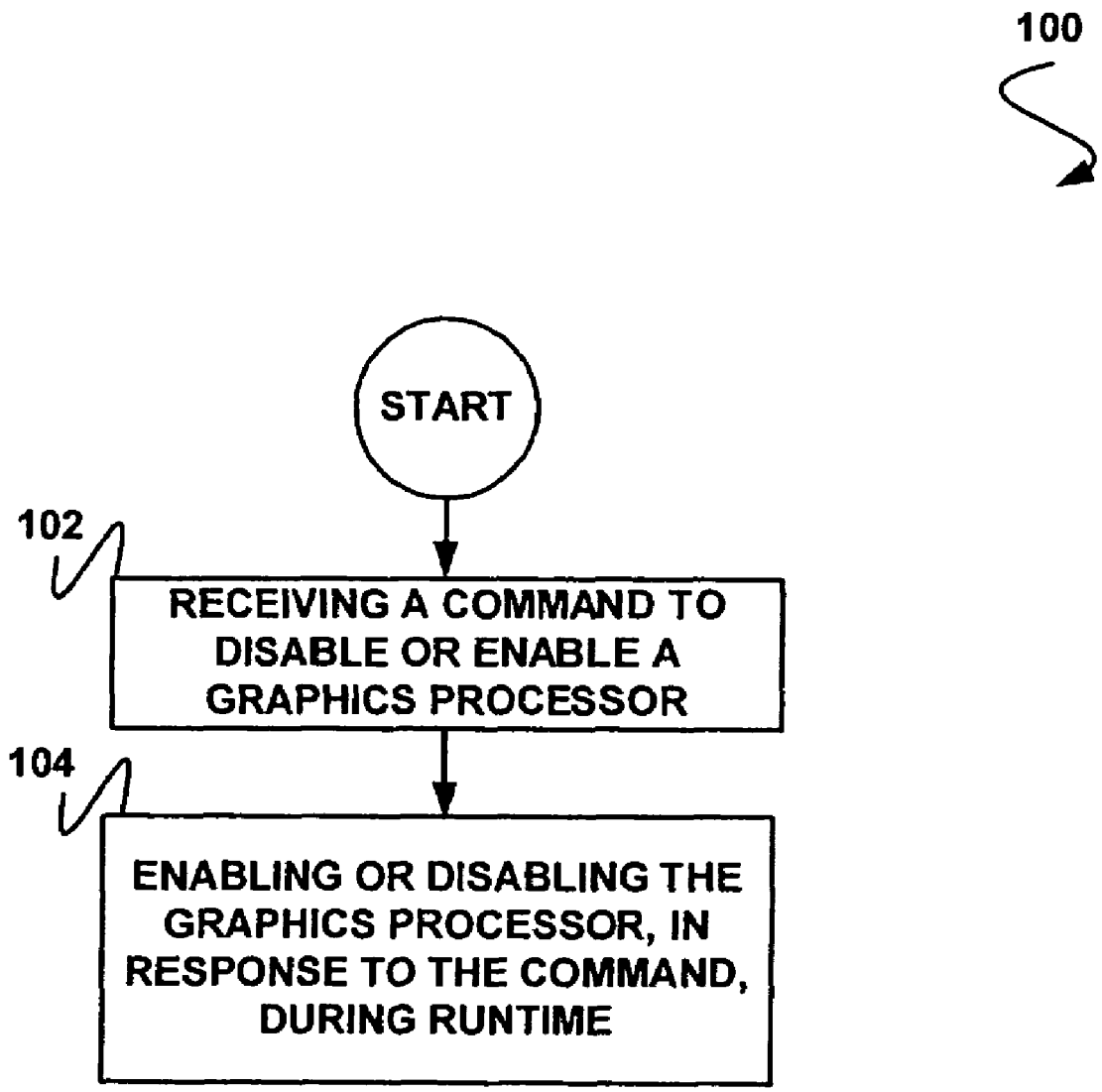
FIG. 1 shows a method for enabling or disabling a graphics processor during runtime, in accordance with one embodiment.

FIG. 1 shows a method 100 for enabling or disabling a graphics processor during runtime, in accordance with one embodiment. As shown, a command is received to disable or enable a graphics processor. Note operation 102. Such command may be any automatically or manually generated command. Just by way of example, such command may include a user command generated in response to a user request. Further, in another embodiment, the command may include a command generated in response to a predetermined level of battery power being detected, a detection of a loss of an alternating current (or any other near infinite) power source, etc.

In various other embodiments, the graphics processor may be internally or externally located with respect to a primary computing processor board, chipset, etc. Implementations are also contemplated where a graphics processor is physically removable (e.g. utilizing a docking station with built-in graphics capabilities, etc.). Of course, in the context of the present description, the term graphics processor refers to any hardware processor capable of processing graphics data.

In operation 104, the graphics processor is enabled or disabled during runtime, in response to the command. Such enabling or disabling may refer to any enabling or disabling of the graphics processor (and/or any component thereof) for the purpose of reducing power consumption by the graphics processor, at least in part. Even still, the term runtime may refer to a particular state of a system associated with the graphics processor, during which an operating system and/or at least one application (using the graphics processor) is currently running.

To this end, the graphics processor may be disabled or enabled for power saving purposes during such runtime. Further, in some optional embodiments to be described hereinafter in greater detail, runtime switching may effectively occur among a plurality of graphics processors.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
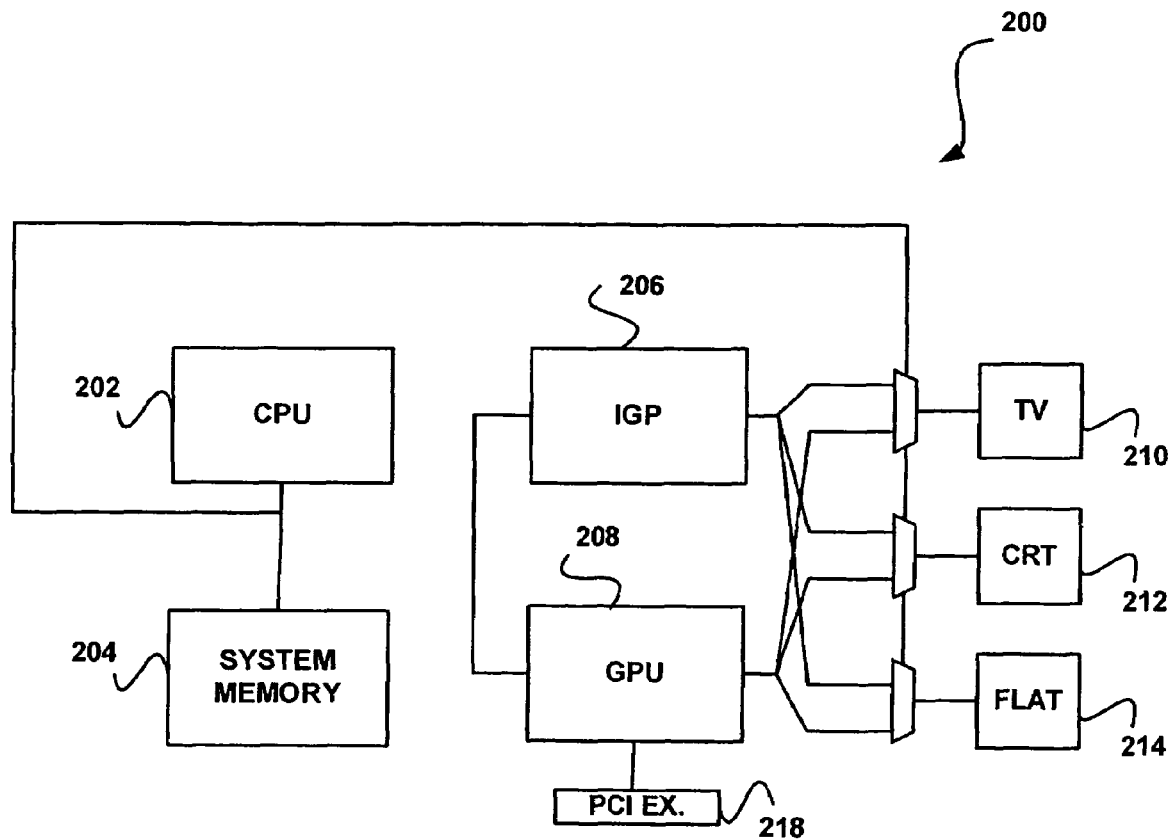
FIG. 2 shows a system for enabling or disabling a graphics processor during runtime, in accordance with one embodiment.

FIG. 2 shows a system 200 for enabling or disabling a graphics processor during runtime, in accordance with one embodiment. As an option, the present system 200 may be the subject of the method 100 of FIG. 1. Of course, however, the system 200 may be used in any desired environment. Still yet, the above definitions apply during the following description.

As shown, the computer system 200 is provided with at least one central processing (CPU) 202 which is connected to a communication bus. The computer system 200 also includes a system memory 204 which is also connected to a communication bus. Control logic (software) and data may be stored in such system memory 204, which may take the form of random access memory (RAM), etc.

The computer system 200 is also equipped with a plurality of graphics processors including a first graphics processor 206 and a second graphics processor 208. Of course, while two graphics processors are shown, a system with more than two of such graphics processors is also contemplated.

In one embodiment, the first graphics processor 206 includes an IGP which may or may not be a component of a chipset resident on a motherboard. Such IGP may be capable of providing a limited amount of graphics processing capabilities as well as using the system memory 204, as opposed to its own dedicated memory. Further, the second graphics processor 208 may include a GPU with each of its various modules (e.g. shader modules, a rasterization module, etc.) integrated on a single semiconductor platform. The GPU may be provided with more advanced graphics processing capabilities as well as its own dedicated memory. Of course, in various embodiments, the first and second graphics processor may or may not be symmetric.

In the context of the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional CPU and bus implementation. Of course, the various modules may also be situated separately or in various combinations of semiconductor platforms per the desires of the user.

With continuing reference to FIG. 2, the second graphics processor 208 may further interface a PCI Express bus 218. Such PCI Express bus 218 may include an I/O interconnect bus standard (which includes a protocol and a layered architecture) that expands on and increases the data transfer rates of the system 200. Specifically, the PCI Express bus 218 may include a two-way, serial connection that carries data in packets along two pairs of point-to-point data paths, compared to single parallel data bus of traditional techniques. In yet another embodiment, NVIDIA® SLI™ technology may be used to connect the graphics processors and associated cards for improved performance.

Further included are one or more displays taking the form of at least one of a television 210, a CRT 212, a flat panel display 214, etc. So as to control the manner in which the first graphics processor 206 and the second graphics processor 208 feed the different displays, a plurality of multiplexers 220 may be provided. As shown, such multiplexers 220 may operate under the control of the CPU 202. Further, any desired mechanism (e.g. use of analog signals, I2C®-related techniques, etc.) may be used to ensure that the presence of any displays is appropriately detected.

The computer system 200 may also include a secondary storage (not shown). The secondary storage includes, for example, a hard disk drive and/or a removable storage drive, representing a floppy disk drive, a magnetic tape drive, a compact disk drive, etc. In use, such removable storage drive reads from and/or writes to a removable storage unit in a well known manner.

Thus, computer programs, or computer control logic algorithms, may be stored in the system memory 204 and/or the unillustrated secondary storage. Such computer programs, when executed, enable the computer system 200 to perform various functions. In the context of the present description, the system memory 204, storage and/or any other storage are possible examples of computer-readable media.

In one embodiment, the architecture and/or functionality set forth herein may be implemented in the context of the CPU 202, graphics processors 206, 208, a chipset (i.e. a group of integrated circuits designed to work and sold as a unit for performing related functions, etc.), and/or any other integrated circuit for that matter. Still yet, from a system perspective, such architecture and/or functionality may also be implemented in the context of a general computer system, a circuit board system, a game console system dedicated for entertainment purposes, an application-specific system, and/or any other desired system, for that matter.

Figure 3A:
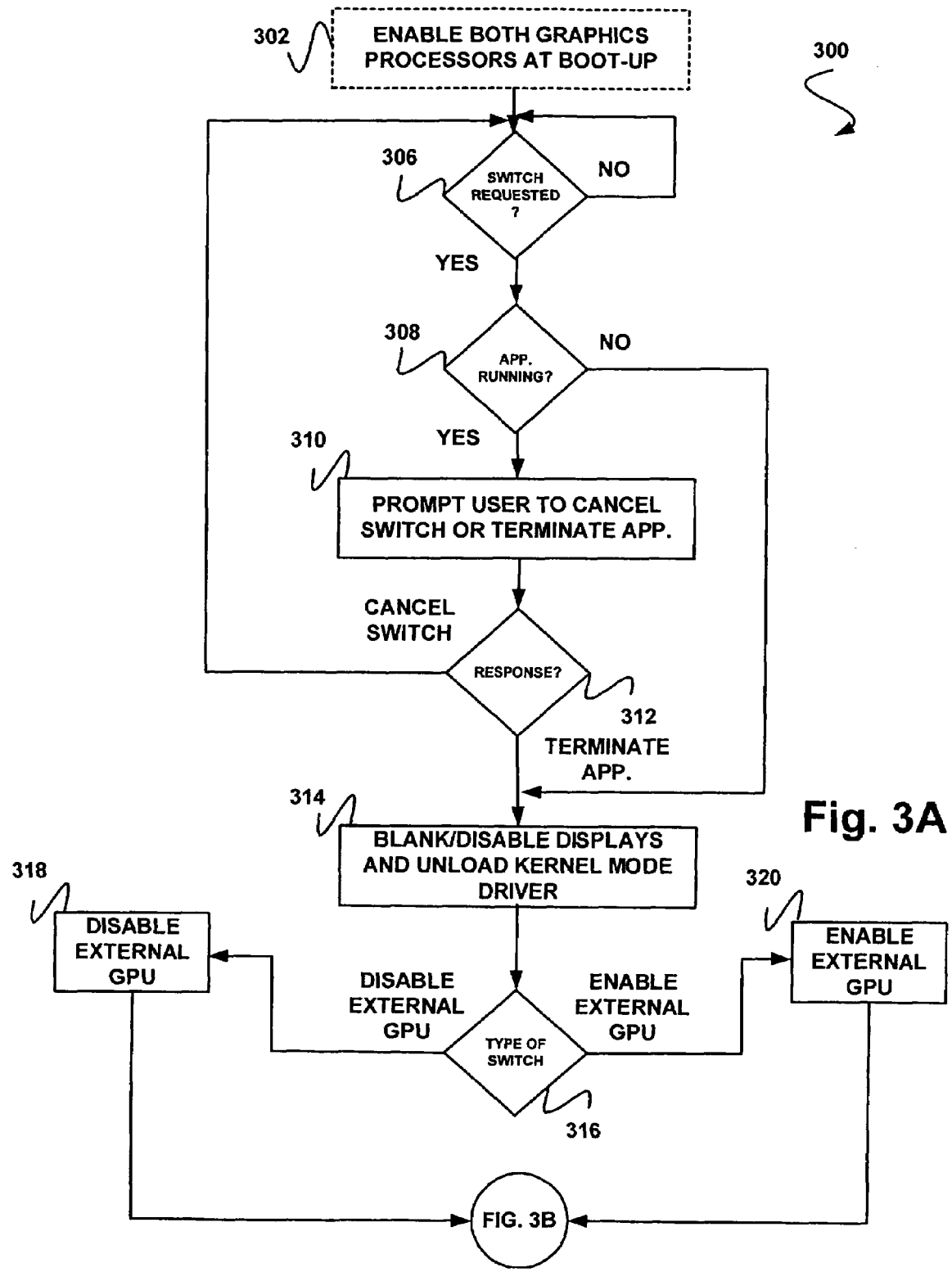
FIGS. 3A-3B show a method for enabling or disabling a graphics processor during runtime, in accordance with another embodiment.
Figure 3B:
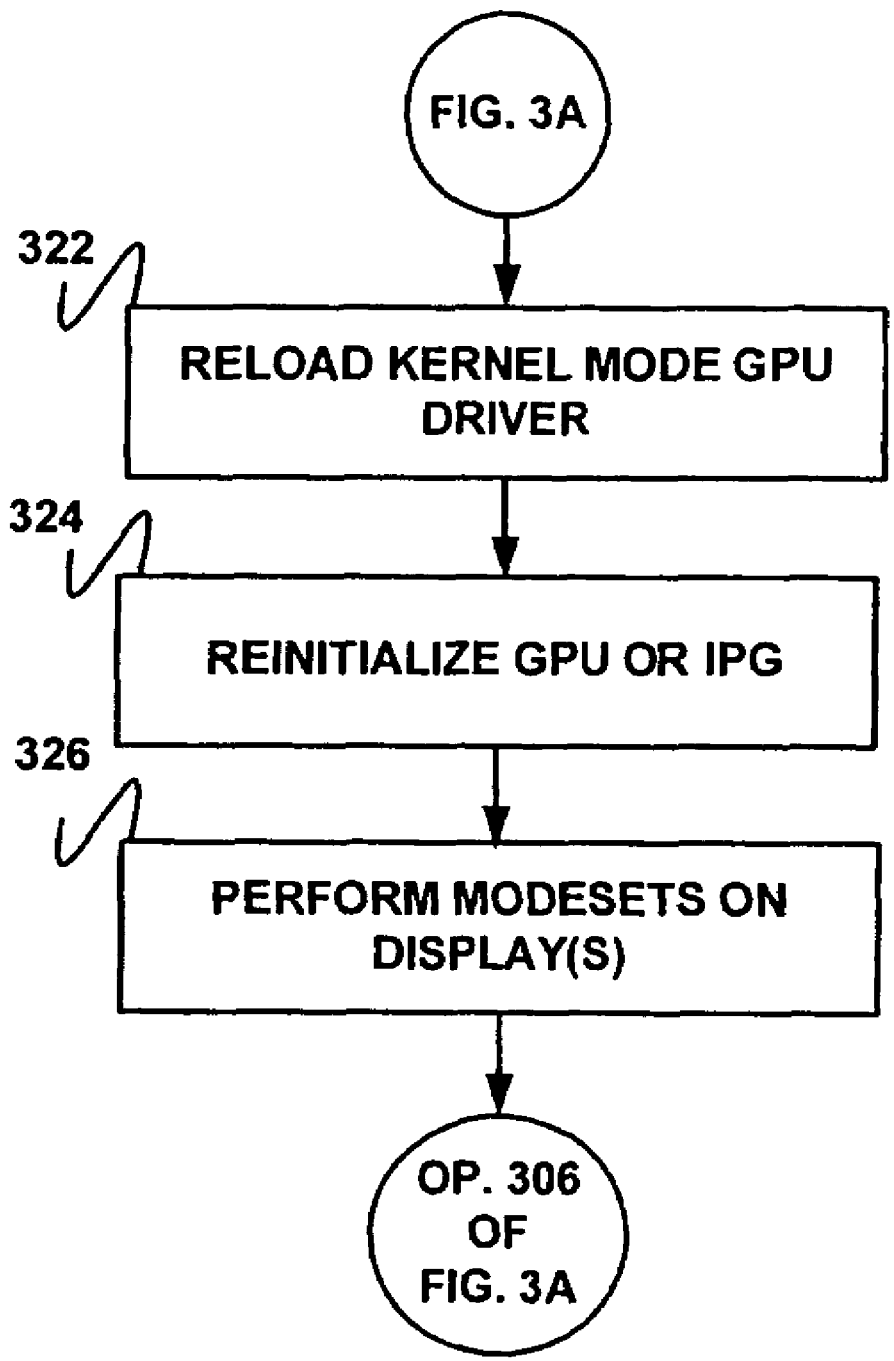

FIGS. 3A-3B show a method 300 for enabling or disabling a graphics processor during runtime, in accordance with another embodiment. As an option, the present method 300 may be carried out in the context of the functionality and/or architecture of FIGS. 1 and 2, respectively. Of course, however, the method 300 may be implemented in any desired environment. Again, the above definitions apply during the following description.

In the context of one embodiment of the present method 300, a first graphics processor (e.g. IGP 206 of FIG. 2) may be running constantly, and further be selectively supplemented with an external second graphics processor (e.g. GPU 208 of FIG. 2). In other words, the first graphics processor may run irrespective of the enabling or disabling of any other graphics processor, and thus be considered a primary graphics processor of the associated system. In such optional embodiment, both graphics processors may be optionally enabled at boot-up. See operation 302.

At any time during runtime (and even at boot-up, etc.), a switch may be requested per decision 306. In the context of the present embodiment, the switch may involve the selective enabling or disabling of the second graphics processor to selectively supplement (or rely solely on) the graphics processing performed by the first graphics processor, in exchange for any power differential.

As mentioned previously, the switch may be requested by any automatic or manual command, etc. Just by way of example, the switch may be requested by an OEM utility by calling the appropriate driver application program interface (API), by the SBIOS via WMI-ACPI (the MICROSOFT WINDOWS Management Instrumentation mapping driver), by a graphics processor device driver control panel interface, etc.

Next, it may be determined whether an application and/or operating system is running. Note decision 308. If running, it is possible that graphics data may be in the midst of processing and stored in associated memory. Specifically, in the case where there is a request for enabling the second graphics processor, the first graphics processor may already have populated system memory with rendered graphics data and/or data in the midst of rendering, etc. Further, in the case where there is a request for disabling the second graphics processor, the second graphics processor may already have populated dedicated memory with rendered graphics data and/or data in the midst of rendering, etc.

Since disabling or enabling the second graphics processor in such a state may result in undesirable visual manifestations, the user is provided with an option to terminate the application(s) and/or operating system, or cancel the switch in response decision 306. Note operation 310. Thus, the application(s)/operating system may continue to run and the switch cancelled, upon the user selecting to cancel the switch. Further, the application(s)/operating system may be terminated, upon the user selecting to terminate. See decision 312. If such termination fails for any particular reason, a re-start operation may be required.

In other embodiments, the switch may simply fail (without user notification), if one or more applications/operation system are found to be running. In other embodiments, the system or graphics processors may be able to hold off transactions and transfer control in a way that does not affect the operating system and/or running applications, allowing what may be a seamless transition. In still other embodiments where an application/operating system is capable of dealing with the enabling or disabling of a graphics processor, a switch may even be seamless. As an option, such seamless switching may allow the reconfiguration of hardware and/or memory allocation without application/operating system input (or knowledge). In these latter embodiments, operations 308-312 may be omitted.

As indicated in operation 314, the one or more displays (e.g. displays 210, 212, 214 of FIG. 2) may then be disabled so that any visual manifestations of the transition are not displayed. Further, a kernel mode driver may be unloaded, as one potential way to halt access to the graphics processors and/or to allow the operating system to reevaluate which devices are active.

Thus, in decision 316, it may be determined whether the switch requested in decision 306 was to enable or disable the second graphics processor. If the switch requested in decision 306 was to enable the second graphics processor, such processor may be enabled. See operation 320. More information regarding such enabling will be set forth during reference to FIG. 4. If, on the other hand, the switch requested in decision 306 was to disable the second graphics processor, such processor may be enabled. See operation 318. More information regarding such disabling will be set forth during reference to FIG. 5.

With reference now to FIG. 3B, the method 300 continues by reloading the kernel driver that was unloaded in operation 314. Note operation 322. Further, in operation 324, the first and/or second graphics processor may be re-initialized, as needed. Finally, in operation 326, one or more mode sets may be performed on the one or more displays in operation 326, after which operation may continue at operation 306 of FIG. 3A. Such mode sets may each include a list of video signal formats supported by the associated display. As an option, a resolution and other display options may be maintained through the disabling or enabling.

Figure 4:
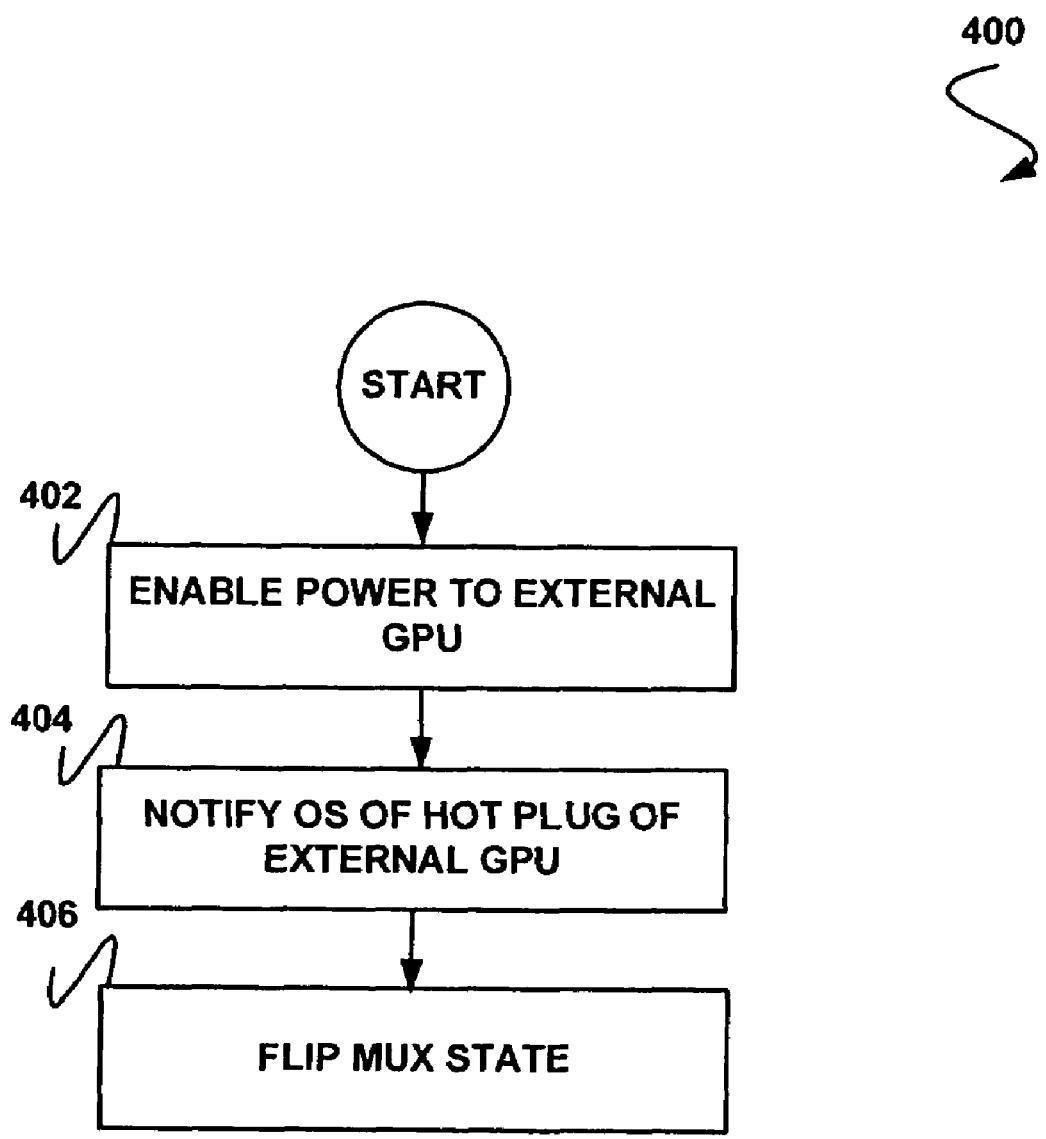
FIG. 4 shows a method for enabling a graphics processor during runtime, in accordance with another embodiment.

FIG. 4 shows a method 400 for enabling a graphics processor during runtime, in accordance with another embodiment. As an option, the present method 400 may be carried out in the context of operation 320 of FIG. 3A. Of course, however, the method 400 may be implemented in any desired environment.

As shown, in operation 402, power to the second graphics processor is enabled. Further, an operating system is notified of a hot plug of the second graphics processor. See operation 404. In one embodiment, hot plugging may refer to the ability to enable or disable a device, while an associated system is operating, without rebooting. Thus, a state of at least one multiplexer (e.g. multiplexers 220 of FIG. 2) may be flipped to ensure that output of the now-enabled second graphics processor is properly fed to the appropriate display(s), as indicated in operation 406.

Even still, in other embodiments, the second graphics processor may be relied upon for all tasks or substantially all tasks with only some exceptions [e.g. post-OS fault or non-driver (sometimes referred to as VGA mode) processing, etc.] which may be exclusively performed by the first graphics processor. In still yet another embodiment (as opposed to an embodiment such as that shown in FIG. 2 where each graphics processor outputs directly to one or more displays), an output of the second graphics processor may be fed to the first graphics processor, such that a sole graphics output stems from the first graphics processor. The graphics processor(s) may also be performing work with no immediate display output, as in the case of offline rendering.

It should also be noted that, when enabled, various graphics processing tasks may be distributed among the first and second graphics processors in a variety of ways. For example, in one embodiment, the second graphics processor may be relied upon only for more intensive graphics processing. Still yet, graphics processing tasks may be divided and distributed based on an application associated with such tasks.

Figure 5:
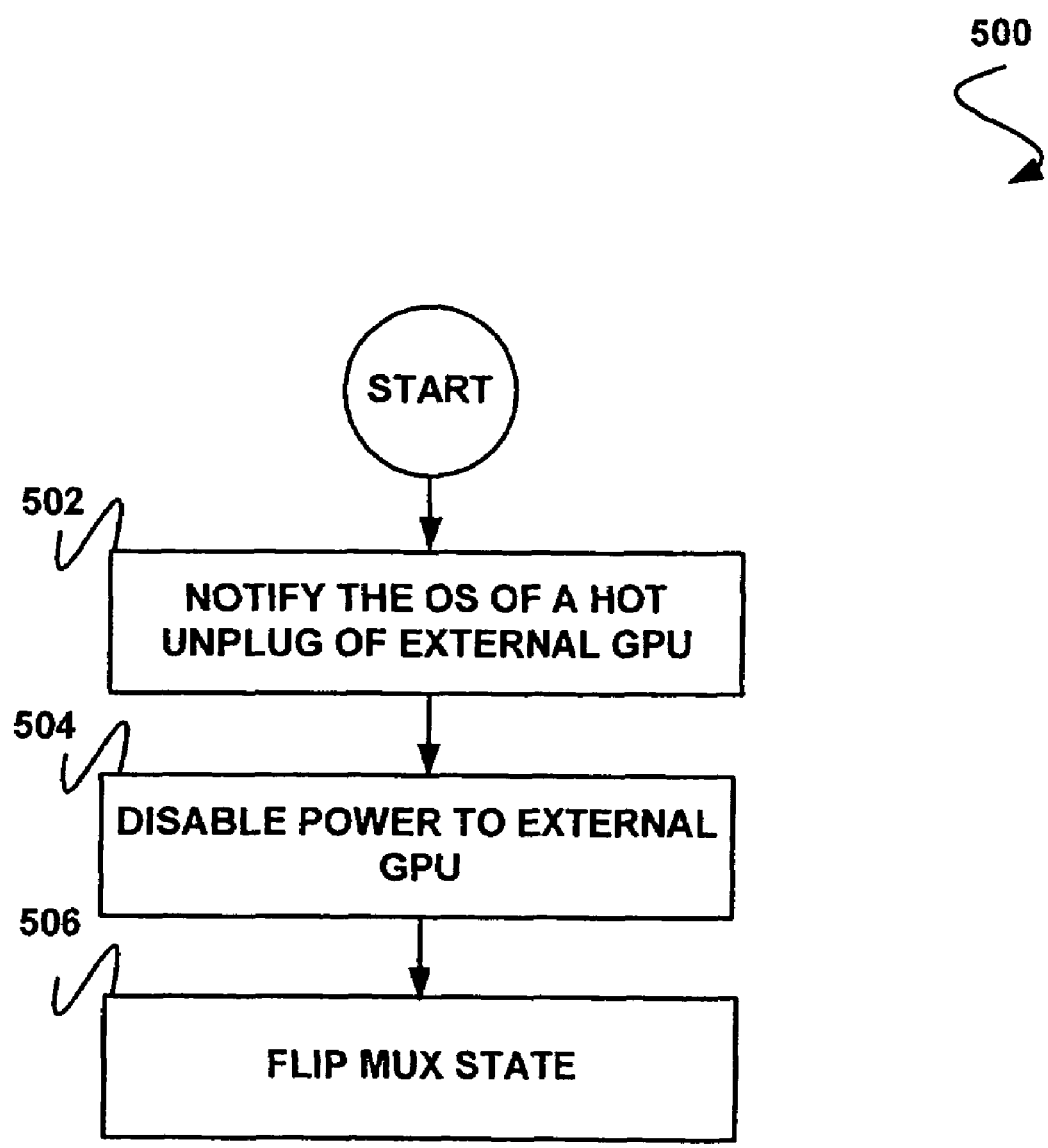
FIG. 5 shows a method for disabling a graphics processor during runtime, in accordance with another embodiment.

FIG. 5 shows a method 500 for disabling a graphics processor during runtime, in accordance with another embodiment. As an option, the present method 500 may be carried out in the context of operation 318 of FIG. 3A. Of course, however, the method 500 may be implemented in any desired environment.

As shown, in operation 502, power to the second graphics processor is disabled, thus ensuring that no power is expended by such processor. Of course, in other embodiments, power to such processor may be only partially disabled (e.g. in a "sleep" mode, etc.) to save at least some power while providing other beneficial features (e.g. quick start up, etc.). Further, an operating system is notified of a hot unplug of the second graphics processor. See operation 504. Thus, a state of at least one multiplexer (e.g. multiplexers 220 of FIG. 2) may be flipped to ensure that output, if any, of the now-disabled second graphics processor is not fed to any of the display(s), as indicated in operation 506.

The disabling of the method 500 thus ensures that any local frame buffer memory is powered down, as well as an associated PCI Express bus, thereby providing optimal power savings. Further, graphics processing capabilities, albeit more limiting, may be provided utilizing the first graphics processor in a manner that is most efficient in terms of power.

To this end, in one embodiment, a user may be capable of enabling or disabling a graphics processor on-the-fly, during runtime. In various optional embodiments, such enabling or disabling may take less than 15, 5, 1 second(s), etc. Further, this may be accomplished without having to power down an associated system, re-booting, etc.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:

booting a system with both of a first hardware graphics processor and a second hardware graphics processor enabled;

after the system has booted, receiving a command to disable the second hardware graphics processor by calling a driver application program interface;

in response to the receipt of the command, determining that an application has already allocated rendered graphics data a dedicated memory of the second hardware graphics processor, and reconfiguring the allocation of the rendered graphics data without the application aware of the reconfiguring;

in response to the determination, unloading a kernel mode driver to halt access by the application to the first hardware graphics processor and the second hardware graphics processor;

disabling the second hardware graphics processor in response to the unloading of the kernel mode driver;
reloading the kernel mode driver previously unloaded to halt access to the first hardware graphics processor and the second hardware graphics processor, in response to the second hardware graphics processor being disabled; and
re-initializing the first hardware graphics processor for resuming operation of the first hardware processor;
wherein the second hardware graphics processor is disabled during runtime without rebooting.

2. The method as recited in claim 1, wherein the second hardware graphics processor includes a hardware graphics processing unit.

3. The method as recited in claim 1, wherein the command is received in response to a user request.

4. The method as recited in claim 1, and further comprising providing the user with an option to terminate the application in response to the command.

5. The method as recited in claim 4, wherein the application is terminated and the second hardware graphics processor is disabled, upon the user selecting to terminate.

6. The method as recited in claim 1, wherein prior to the disabling of the second hardware graphics processor, at least one display is disabled.

7. The method as recited in claim 1, wherein after the disabling of the second hardware graphics processor, at least one mode set is performed on at least one display.

8. The method as recited in claim 1, wherein the disabling of the second hardware graphics processor includes disabling power to the second hardware graphics processor.

9. The method as recited in claim 1, wherein an additional hardware graphics processor continues operating irrespective of the disabling of the second hardware graphics processor.

10. The method as recited in claim 9, wherein the additional hardware graphics processor is non-symmetric with respect to the second hardware graphics processor being disabled.

11. The method as recited in claim 1, and further comprising notifying an operating system, in response to the command.

12. The method as recited in claim 1, wherein an operating system is notified of a hot unplug of the second hardware graphics processor.

13. The method as recited in claim 12, wherein the hot unplug of the second hardware graphics processor includes disabling the second hardware graphics processor without rebooting the operating system.

14. The method as recited in claim 1, wherein disabling of the second hardware graphics processor includes partially disabling power to the second hardware graphics processor.

15. The method as recited in claim 1, wherein disabling the second hardware graphics processor includes powering down local frame buffer memory and an associated PCI Express bus.

16. The method as recited in claim 1, wherein the first hardware graphics processor performs work with no immediate display output.

17. The method as recited in claim 1, further including flipping a state of at least one multiplexer for preventing a display from receiving an output from the disabled second hardware graphics processor.

18. The method as recited in claim 1, wherein the call for the driver application program interface originates from an OEM utility.

19. The method as recited in claim 1, wherein the call for the driver application program interface originates from a SBIOS via the Microsoft Windows Management Instrumentation mapping driver.

20. The method as recited in claim 1, further including determining, prior to the reconfiguring of the allocation of the rendered graphics data, that the application is capable of operating after the disabling of the second hardware graphics processor.

21. A computer program product embodied on a non-transitory computer readable medium, comprising:
computer code for booting a system with both of a first hardware graphics processor and a second hardware graphics processor enabled;
computer code for, after the system has booted, receiving a command to disable the second hardware graphics processor by calling a driver application pro ram interface;
computer code for, in response to the receipt of the command, determining that an application has already allocated rendered graphics data to a dedicated memory of the second hardware graphics processor, and reconfiguring the allocation of the rendered graphics data without the application aware of the reconfiguring;
computer code for, in response to the determination, unloading a kernel mode driver to halt access by the application to the first hardware graphics processor and the second hardware graphics processor;
computer code for disabling the second hardware graphics processor in response to the unloading of the kernel mode driver;
computer code for reloading the kernel mode driver previously unloaded to halt access to the first hardware graphics processor and the second hardware graphics processor, in response to the second hardware graphics processor being disabled; and
computer code for re-initializing the first hardware graphics processor for resuming operation of the first hardware graphics processor;
wherein the second hardware graphics processor is disabled during runtime without rebooting.

22. A system,
comprising:
a first graphics processor; and
a second hardware graphics processor having a dedicated memory;
wherein the system is booted with both of the first hardware graphics processor and the second hardware graphics processor enabled;
wherein the system is operable such that after the system has booted, a command is received to disable the second hardware graphics processor by calling a driver application program interface;
wherein the system is operable such that, in response to the receipt of the command, it is determined that an application has already allocated rendered graphics data to the dedicated memory of the second hardware graphics processor, and the allocation of the rendered graphics data is reconfigured without the application aware of the reconfiguring;
wherein the system is operable such that, in response to the determination, a kernel mode driver is unloaded to halt access by the application to the first hardware graphics processor and the second hardware graphics processor;
wherein the system is operable such that the second hardware graphics processor is disabled in response to the unloading of the kernel mode driver;
wherein the system is operable such that the kernel mode driver, previously unloaded to halt access to the first hardware graphics processor and the second hardware graphics processor, is reloaded, in response to the second hardware a graphics processor being disabled;
wherein the system is operable such that the first hardware graphics processor is re-initialized for resuming operation of the first hardware graphics processor;
wherein the system is operable such that the second hardware graphics processor is disabled during runtime without rebooting.

* * * * *

UNITED STATES PATENT AND TRADEMARK OFFICE
CERTIFICATE OF CORRECTION

PATENT NO. : 8,199,155 B2
APPLICATION NO. : 11/604105
DATED : June 12, 2012
INVENTOR(S) : Leroy et al.

Page 1 of 1

It is certified that error appears in the above-identified patent and that said Letters Patent is hereby corrected as shown below:

In the Claims

Claim 1, col. 6, line 60; please replace "data a" with --data to a--;
Claim 1, col. 7, line 9; please replace "hardware processor" with --hardware graphics processor--;
Claim 21, col. 8, line 17; please replace "pro ram" with --program--;
Claim 22, col. 8, line 42; please replace "first graphics" with --first hardware graphics--;
Claim 22, col. 9, line 2; please remove "a".

Signed and Sealed this
Fourth Day of June, 2013

Teresa Stanek Rea
*Acting Director of the United States Patent and Trademark Office*